July 3, 1923.

P. H. BRODESSER

SYSTEM OF CONTROL FOR ELECTRIC ELEVATORS

Filed Aug. 26, 1920

Peter H. Brodesser INVENTOR.

BY

Erwin, Wheeler and Woolard ATTORNEYS.

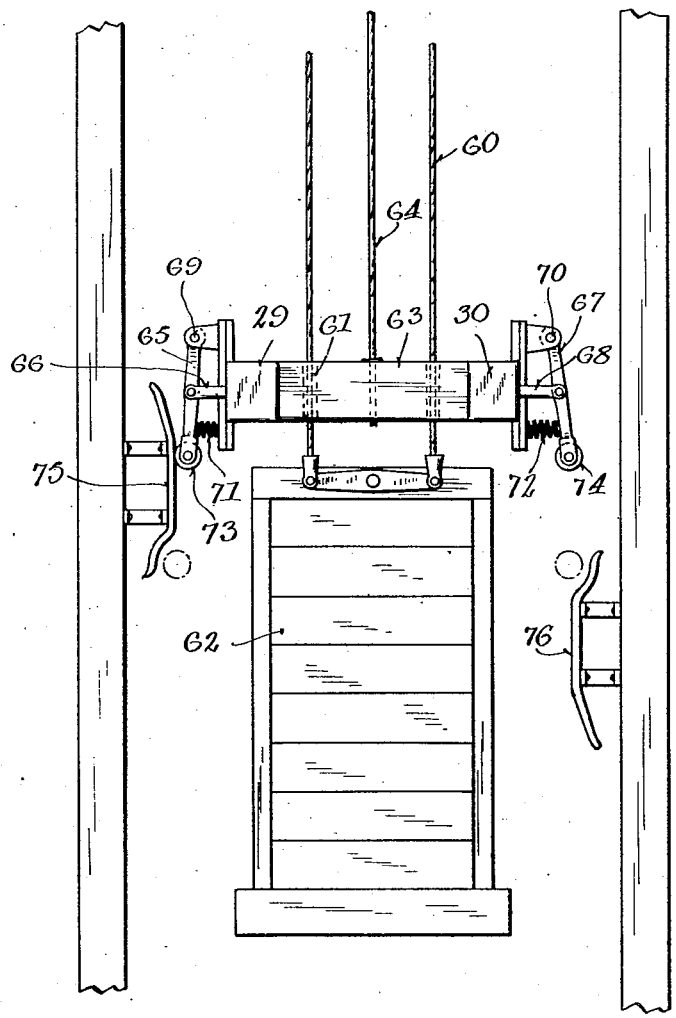

Patented July 3, 1923.

1,460,569

UNITED STATES PATENT OFFICE.

PETER H. BRODESSER, OF MILWAUKEE, WISCONSIN.

SYSTEM OF CONTROL FOR ELECTRIC ELEVATORS.

Application filed August 26, 1920. Serial No. 406,043.

*To all whom it may concern:*

Be it known that I, PETER H. BRODESSER, a citizen of the United States, residing at Milwaukee, county of Milwaukee, and State of Wisconsin, have invented new and useful Improvements in Systems of Control for Electric Elevators, of which the following is a specification.

This invention relates to a system of control for electric elevators.

It is particularly directed to a system in which exact alignment of the elevator and the floor at which a stop is made is secured.

In electric elevators, both passenger and freight elevators, considerable difficulty has been experienced in stopping the elevator exactly in line with the floor. Attempts have been made to solve this difficulty by providing auxiliary motors to adjust the elevator to the desired position, but these attempts have not been altogether satisfactory for the reason that they necessitated complicated mechanism, such for instance, as a revolving brake, in which case, the brake was effective merely for braking when one motor was used and was not effective for braking when the other motor was used.

It is to overcome the objections to the former devices that the present invention is designed.

One of the objects of this invention is to provide a system of control for electric elevators whereby an auxiliary motor automatically aligns the elevator with the particular floor at which the stop is to be made.

Other objects of this invention are to provide a system of control for electric elevators in which the brake is relatively stationary; in which the brake and auxiliary motor jointly and independently sustain the load when the elevator is at rest.

Other objects are to provied means for electromagnetically shifting the load from the main motor to the auxiliary motor when the main motor is inoperative and for shifting the load from the auxiliary motor to the main motor when the main motor is operative.

A further object is to provide means for controlling the operation of the auxiliary motor independently of the stretch in the main cables of the elevator so that the car will automatically align with the floor whether or not the main cables have become stretched in the ordinary use of the elevator.

Other objects of this invention are to provide means for automatically adjusting the elevator at the desired point when the main motor is inoperative in a simple and efficient manner and by means which are not likely to get out of order.

In the drawings—

Fig. 4 is a view showing the automatic switches and the counterweights with which they are associated.

Figure 1:
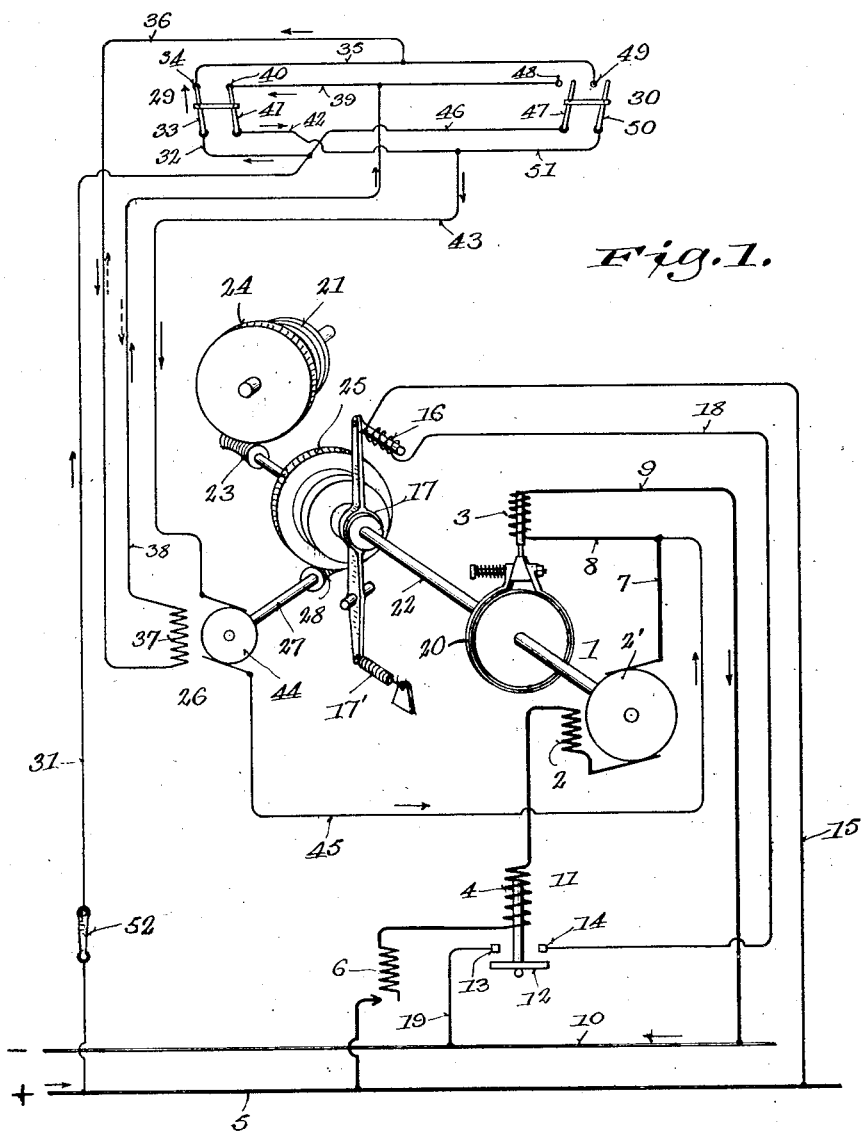
Figure 1 is a diagrammatic view showing in perspective the main and auxiliary motors and the associated mechanism together with the electrical system employed, and illustrates the connections employed when the auxiliary motor is adjusting the car in one position, the main motor circuit then being open.

Fig. 1 will first be described. In this figure, 1 represents generally the main motor having fields 2 and armature 2′, 3 the brake solenoid, and 4 a contactor solenoid. These elements are connected in series when the main motor is operated as follows: From the positive main 5 thru a suitable control resistance 6, contactor solenoid 4, the fields 2, armature 2′, conductors 7 and 8, brake solenoid 3, conductor 9 to negative main 10. It is of course to be understood that altho a simple, variable resistance is shown for the main motor any convenient means of control, including suitable reversing switches, automatic switches and other standard equipment, may be employed in controlling the main motor. When current is supplied the main motor, the contactor 11 has its coils 4 energized and draws its switch member 12 into position to close the circuit between contacts 13 and 14. Under these conditions, current flows from the positive main 5 thru conductor 15, solenoid 16 (which controls the clutch 17), conductor 18, thru the contactor switch, conductor 19 to negative main 10. It will thus be seen that when current is supplied the main motor the solenoid 16 is energized, thereby opening the clutch 17, and also that the brake solenoid 3 is energized thereby releasing the brake 20.

When the main motor is operated, the brake 20 is of course in released position and the motor drives the hoisting drum 21 thru the medium of the shaft 22, worm 23, and worm wheel 24.

When current is cut off from the main motor, the contactor 12 drops open, thereby opening the circuit of the solenoid 16 and allowing the clutch 17 to be closed by the spring 17' locking the worm wheel 25 to the shaft 22, such worm wheel otherwise running loosely upon such shaft. In this position, the auxiliary motor 26 is mechanically coupled to the hoisting drum thru the medium of the shaft 27, worm 28, worm wheel 25, shaft 22, worm 23, and worm wheel 24.

The adjusting of the car to the exact alignment with the floor will now be described. A pair of switches 29 and 30 are carried adjacent the counterweights and are arranged to be controlled by inclined members arranged above and below the line at which the counterweights are supposed to stop and corresponding to the line at which the car is supposed to stop. As shown in Fig. 1, the conditions are such as obtained when the car is below the desired point and the switch 29 is closed by the mechanism just described. Under these conditions, current flows from the positive main 5 thru conductor 31, conductor 32 to switch blade 33, contact 34, conductors 35 and 36, thru auxiliary motor field 37, conductor 38, conductor 39, contact 40, switch member 41, conductor 42, conductor 43, thru auxiliary motor armature 44, conductors 45 and 8, brake solenoid 3, conductor 9 to negative main 10.

It will thus be seen that the motor is actuated in the direction to raise the car to the desired point of alignment with the floor and that the brake is released. Under these conditions, the auxiliary motor continues to operate until the car is properly aligned at which time switch 29 is automatically opened by means of the inclined members previously mentioned. If, for instance, the car had passed above the floor, the switch 30 would then be closed thru the action of its corresponding inclined member and the auxiliary motor would then be reversed, the current path being as follows. From the positive main 5, conductors 31 and 46, switch blade 47, contact 48, conductors 39 and 38, field 37 of the auxiliary motor, conductors 36 and 35, contact 49, switch member 50, conductors 51 and 43, motor armature 44, conductor 45, brake solenoid 3, conductor 9 to negative main. It will be seen that while the direction of the current in the armature of the auxiliary motor is the same as before, the direction of current in the field is reversed thereby reversing the rotation of the motor and causing the car to be lowered until the desired point is reached, at which time the switch 30 will open. A switch 52 may be placed in the car to be manually opened or closed to thereby cause the automatic device to be either inactive or active as desired.

Figure 2:
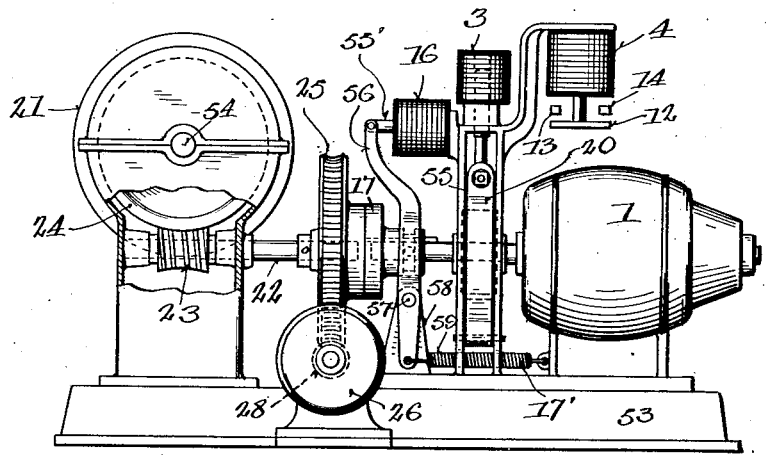
Fig. 2 is a side elevation of the motor hoisting drum and associated mechanism.
Figure 3:
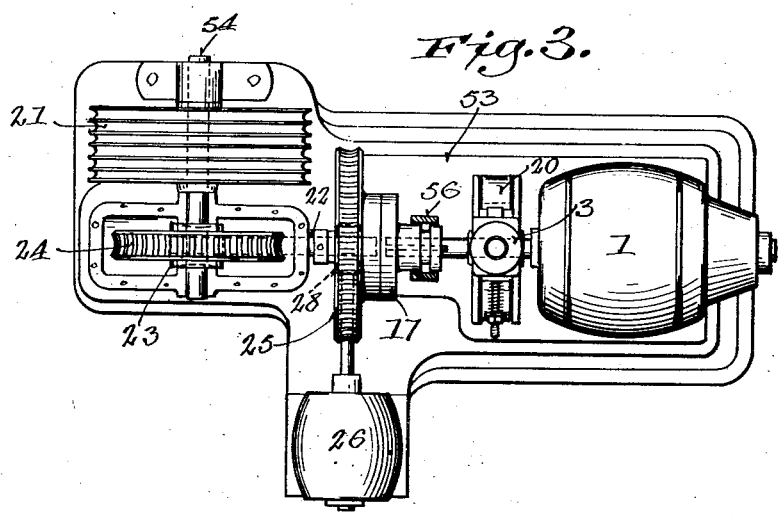
Fig. 3 is a plan view thereof.

Figs. 2 and 3 are respectively elevations and plans of the main and auxiliary motors, the hoisting drum and the associated mechanisms. These motors may conveniently be mounted upon a base 53 with the main shaft 22 extending longitudinally of the base and the hoisting drum shaft and auxiliary motor shaft 54 and 27, respectively, extending transversely of the base. A bracket 55 extends upwardly from the base and carries the brake 20, the brake solenoid 3, the contactor, and the clutch solenoid 16. The plunger 55' of the clutch solenoid is connected with the clutch lever 56, the lower portion of the clutch lever being pivotally mounted at 57 upon a lug 58 extending upwardly from the base. The extreme lower portion of the clutch lever 56 is drawn to the right by means of a spring 59 to cause the clutch to move into engaging position when the solenoid is deenergized. The auxiliary motor 26 is conveniently mounted below the main shaft 22 and the worm 28 is directly mounted upon the auxiliary motor shaft. When the auxiliary motor operates, the main motor is rotated slowly as the shaft 22 is directly coupled at all times to the main motor armature. This, however, does not place any material load upon the auxiliary motor as the energy required is simply that to overcome the friction of the main motor.

Fig. 4 shows the arrangement of counterweights, cables, guides, and inclined devices. The main cables 60 freely extend thru openings 61 in a cross-head and are attached at their lower ends to the counter-weight 62. The cross-head 63 is supported by an auxiliary cable 64 so that elongation of the main cables during the ordinary use of the elevator does not affect the positioning of the cross-head 63 as it is carried independently of the main cables and of the counterweights. This cross-head 63 carries the switches 29 and 30 which are respectively actuated by levers and plungers 65, 66 and 67, 68. These levers 65 and 67 are pivotally mounted at 69 and 70 on the cross-head 63 and are spring pressed outwardly by springs 71 and 72, respectively. Their lower, free ends carry rollers 73 and 74 which are adapted to ride over inclined members 75 and 76, respectively. These rollers are conveniently placed upon the same horizontal line and it will be seen that the positioning of members 75 and 76 is such that when these rollers occupy their dotted line position as shown in this figure, the switches are then both opened and the auxiliary motor circuit is therefore open. If, however, the car stops in such a position that the cross-head 63 is as shown in full lines in Fig. 4, the left hand switch 29 will be closed as the roller 73 is now upon the member 75. This causes the auxiliary motor to raise the car, thereby lowering the cross-head 63 until the rollers arrive at their dotted line position. The switch member 30, and its lever 67, roller 74, and member 76 of course operate in a reverse manner.

It will be seen that a system of control has been provided whereby the elevator is automatically aligned with the desired floor in a simple, efficient and direct manner.

It will also be seen that means have been provided whereby the auxiliary motor is directly controlled independently of the manual control of the main motor thereby providing a positive and simple control for the accurate adjustment mechanism of the device. It will also be seen that by providing the contactor so that it is effective when the main motor circuit is closed the electromagnetic clutch is positively and accurately timed in its operation in proper relation to the operation of the main and auxiliary motors. The provision of the auxiliary cross-head and its independent supporting cable makes it possible to arrange the controlling switches for the auxiliary motor at a point where it will not be interfered with by the car and will therefore be less likely to be subjected to damage. Also this auxiliary cable causes the cross-head to assume the same relative position for corresponding stops of the car independently of the stretching of the main cable.

I claim:

1. In a control apparatus for electric elevators provided with traveling devices adapted to be intermittently raised and lowered, the combination of a hoisting drum, a main motor operatively connected therewith, an auxiliary motor means operable from the traveling devices for energizing the auxiliary motor intermittently, and a relatively stationary brake electrically energized to open upon the energization of either motor and to close after the deenergization of both motors and independently of either motor, whereby said motors may be repeatedly alternately connected to said hoisting drum.

2. A control apparatus for electric elevators comprising a hoisting drum, a main motor permanently operatively connected thereto, an auxiliary motor, means electrically controlled as to release from the circuit of the main motor for intermittently and repeatedly connecting said hoisting drum and auxiliary motor whenever the main motor is de-energized, and an electromagnetic brake electrically associated with both of said motors to release when either of said motors is energized and to close when both of said motors are deenergized.

3. In an apparatus for controlling the motion of electric elevators, the combination of a hoisting drum, a main motor permanently operatively connected thereto, an auxiliary motor disconnected therefrom and adapted to be connected thereto when said main motor is de-energized, means for connecting said auxiliary motor operatively to said hoisting drum, and an electromagnetic brake acting directly upon the load independently of said auxiliary motor and arranged to release when said auxiliary motor is energized.

4. In a device for controlling the motion of electric elevators, the combination of hoisting mechanism arranged to hoist said elevator, a main motor operatively connected with said mechanism, an auxiliary motor, auxiliary driving mechanism, means for connecting said auxiliary motor driving mechanism to said hoisting mechanism when said main motor is de-energized and disconnecting it therefrom when said main motor is energized, and an electromagnetic brake, said electromagnetic brake an auxiliary motor driving mechanism jointly and independently sustaining the load when said main motor is not energized.

5. In combination, a hoisting drum, a main motor having its shaft operatively connected with said hoisting drum, an auxiliary motor having a loose connection with said main motor shaft, a clutch for operatively connecting the auxiliary motor to said shaft, electromagnetic means for controlling the operation of said clutch, and a contactor for controlling the operation of said electromagnetic means, said contactor having a control coil electrically connected in series with said main motor, whereby said electromagnetic means is placed directly under the control of said main motor and is thereby directly dependent upon the energization of said main motor.

6. In an electric elevator the combination of a reciprocatory load carrier, main and auxiliary motors having connections adapted to transmit motion to the hoisting mechanism at different speeds, an independently acting mechanical brake having an electrically operated releasing device provided with an exciting coil in series with both motors, means for automatically connecting up the energizing circuit of the auxiliary motor at predetermined positions of the load carrier, and means for automatically releasing the motion transmitting connections of the auxiliary motor from the load carrier when the main motor is energized, said last mentioned means including a contactor having a coil in series with said main motor.

7. In an electric elevator, the combination with a load carrier, of two electric motors respectively adapted to actuate the load carrier at different speeds, an electromagnetic device for disconnecting one of the motors from the load carrier, an independently acting automatic brake, an electromagnetic device for releasing the brake when either of the motors is energized, and a contactor controlling a circuit of the first mentioned electromagnetic device, said contactors and brake releasing device having exciting coils in series with each other, whereby both electromagnetic devices are necessarily simultaneously operative.

8. In an electric elevator, the combination of a car, hoisting mechanism connected thereto, a main electric motor mechanically connected to said hoisting mechanism, an auxiliary motor, means for selectively mechanically connecting said auxiliary motor to said hoisting mechanism when said main motor is not energized, manual means for electrically controlling said main motor, automatic means controlled by the position of said car for electrically controlling said auxiliary motor independently of the manual control of said main motor, and other manual means for electrically controlling said auxiliary motor in conjunction with said automatic means.

9. In an electric elevator having a reciprocatory load carrier and two actuating motors, one manually controlled for operating the carrier between landings and the other automatically operative to actuate the load carrier at less speed in the vicinity of the landings, a contactor and a brake having controlling coils in series with each other, and means controlled by the contactor for releasing the connections between the carrier and the automatically operative motor when the manually controlled motor is energized.

10. In an electric elevator device, adapted to start, stop, and reverse the combination of a hoisting mechanism, a main motor operatively connected thereto, an auxiliary motor, means for mechanically connecting said auxiliary motor and said hoisting mechanism when said main motor is not energized, separate and distinct means for electrically controlling said motors, and an electromagnetic brake, electrically associated with both motors and arranged to be released by the current supplied either motor.

11. In an electric elevator device, adapted to start, stop and reverse the combination of a hoisting mechanism, a main motor operatively connected thereto, an auxiliary motor, means for mechanically connecting said auxiliary motor and said hoisting mechanism when said main motor is not energized, manual means for electrically controlling said main motor, automatic means for electrically controlling said auxiliary motor, and an electromagnetic brake connected in series with said main motor and in series with said auxiliary motor and arranged to be released by the current suppled either motor.

12. An electric elevator provided with main and auxiliary driving motors, an electromagnetic brake controlled as to release by the energizing current of each motor independently of the other and adapted to automatically hold the load from movement when both motors are electrically disengaged, means for automatically operating the auxiliary motor at predetermined intervals of elevator operation, and automatic means for disconnecting the mechanical driving connections of the auxiliary motor with the elevator while the main motor is in operation, and means for automatically reconnecting the auxiliary motor to the elevator for mechanical power transmission when the main motor becomes de-energized.

13. In combination, an elevator mechanism, provided with a load carrier, landings at intervals along the line of carrier travel, a manually controlled main motor for operating the carrier between landings, an auxiliary motor provided with means for operating the carrier at reduced speed in the vicinity of a landing, a mechanical holding device adapted to automatically maintain the position of the carrier when both motors are de-energized, means, including an electrically operated device in series with both motors, for releasing the holding device, an electrically operated contactor having a controlling coil in the main motor circuit, electromagnetic means controlled by the contactor for disconnecting the auxiliary motor from operative relation to the carrier when the main motor is energized, and switches, automatically controlled by the elevator mechanism, for connecting up the circuit of the auxiliary motor when the carrier is in the vicinity of a landing.

14. In an electric elevator having a reciprocatory load carrier, a main electric motor for reciprocating the carrier at normal speeds, an auxiliary motor for operating the carrier at reduced speed preparatory to stopping its motion, and a relatively stationary brake associated with the shaft of the main motor to hold it and the load carrier, said brake being operative only when the motors are de-energized.

In testimony whereof I affix my signature in the presence of two witnesses.

PETER H. BRODESSER.

Witnesses:
W. F. WOOLARD,
S. L. WHEELER.